(12) United States Patent
Tonnqvist et al.

(10) Patent No.: US 6,631,702 B2
(45) Date of Patent: Oct. 14, 2003

(54) INTERNAL COMBUSTION ENGINE

(75) Inventors: Andreas Tonnqvist, Askim (SE); Andrzej Zarowiecki, Torslanda (SE)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 10/065,618

(22) Filed: Nov. 4, 2002

(65) Prior Publication Data

US 2003/0116117 A1 Jun. 26, 2003

(30) Foreign Application Priority Data

Dec. 21, 2001 (GB) ............................................. 01850216

(51) Int. Cl.$^7$ ............................................... F02B 77/00
(52) U.S. Cl. ................................ 123/198 R; 123/195 A
(58) Field of Search ..................... 123/195 A, 198 R, 123/198 C

(56) References Cited

U.S. PATENT DOCUMENTS

| 3,429,304 A | * | 2/1969 | Wiseman et al. | ....... 123/195 A |
| 3,719,178 A | | 3/1973 | Stewart | |
| 4,114,586 A | * | 9/1978 | Fujikawa et al. | ....... 123/195 A |
| 4,412,515 A | * | 11/1983 | Fritzenwenger | ......... 123/198 E |
| 4,459,950 A | * | 7/1984 | Kasting | ................... 123/195 A |
| 4,462,482 A | * | 7/1984 | Tsuboi | ........................ 180/230 |
| 5,873,336 A | | 2/1999 | Uchida | |

FOREIGN PATENT DOCUMENTS

| CH | 170540 | 10/1934 | | |
| DE | 2153773 | 5/1972 | | |
| DE | 19939813 A1 | 2/2001 | | |
| EP | 0318971 B1 | 2/1994 | | |
| EP | 0578267 B1 | 10/1997 | | |
| EP | 1038719 A1 | 9/2000 | | |
| FR | 1211391 | 3/1960 | | |
| JP | 63253122 A | * 10/1988 | ........... | F02B/63/04 |
| JP | 01113521 A | * 5/1989 | ........... | F02B/67/06 |
| JP | 01-249922 | 10/1989 | | |
| WO | WO 91/16530 | 10/1991 | | |

* cited by examiner

*Primary Examiner*—Noah P. Kamen
(74) *Attorney, Agent, or Firm*—Diana D. Brehob

(57) ABSTRACT

An internal combustion engine, comprising an engine block (1), a crankshaft rotatably journalled in the engine block and a transmission (2) mounted at one side of the engine block is disclosed. The transmission has an input shaft driven by the crankshaft and two concentrically journalled output shafts (11,14). One output shaft (11) is drivingly connected to an integrated starter/generator (3) while the other one (14) is connected to a chain sprocket (25) for a camshaft chain.

14 Claims, 4 Drawing Sheets

INTERNAL COMBUSTION ENGINE

BACKGROUND OF INVENTION

1. Field of the Invention

The invention relates to an internal combustion engine, comprising an engine block, a crankshaft rotatably journalled in the engine block and an auxiliary drive transmission mounted at one side of the engine block. The transmission has an input shaft with an input gear wheel meshing with an output gear wheel driven by the crankshaft and a first output shaft driven by the input shaft for driving at least one auxiliary unit.

2. Background of the Invention

Usually, in common internal combustion engines, auxiliary units, such as water pumps, generators, pumps for power steering, and air conditioning, are driven by the crankshaft via pulleys or gear wheels mounted on an end portion of the crankshaft extending outside of the crankcase. The same is true for engine components, such as camshafts and fuel pumps, which often are driven via a toothed pulley and belt at the front end of the engine block. These auxiliary units, and the driving assembly at the front end of the engine, increase the total length of the engine and require space in the engine compartment. Basically, this is not a problem in vehicles having longitudinally mounted engines. But, when it comes to transverse mounted engines, space is more limited, particularly in those having more than four cylinders. For example, those with six cylinders are usually V-engines.

It is known in the art to reduce the space requirements of an in line engine, e.g., an in-line, six-cylinder engine, by arranging an auxiliary drive transmission (transmission heretofore refers to auxiliary drive transmission) for auxiliary units at one side of the engine. For instance, DE 2 153 773 discloses an in-line, six-cylinder engine having a side-mounted transmission with a single output shaft drivingly connected to a fuel injection pump and an air compressor. The generator, however, which preferably operates at a higher rpm than the fuel injection pump, is driven in a conventional manner by a separate pulley and belt transmission in the front end of the engine block.

SUMMARY OF INVENTION

Drawbacks of prior approaches are overcome by an internal combustion engine with an engine block, a crankshaft rotatably journalled in the engine block, and a transmission mounted at one side of the engine block. The transmission has an input shaft with an input gear wheel meshing with an output gear wheel driven by the crankshaft and a first output shaft driven by the input shaft for driving at least one auxiliary unit. The transmission has a second output shaft with the first and second output shafts being driven with different speeds of rotation from the input shaft. Furthermore, a first and a second gear wheel on the input shaft meshes with a first and a second output gear wheel on the first and second output shafts, respectively, with the first and second input shafts having a common axis.

An advantage of the present invention is an internal combustion engine which is short, for example, a five-cylinder in-line engine with auxiliary devices according to the present invention is no longer than a conventional, previously known, four-cylinder in-line engine with auxiliary devices.

More specifically, an advantage of the invention is to achieve an internal combustion engine which has a compact transmission design and drives at least two auxiliary units, or engine components, at different input speeds.

A further advantage of the invention is to achieve an internal combustion engine with a side mounted transmission which is particularly suitable to enable driving one auxiliary unit by another auxiliary unit, e.g., driving an air conditioning compressor by an integrated starter/generator when the engine is not running.

These and further advantages are achieved according to the invention by virtue of the fact that the transmission has a second output shaft, the first and second shafts being driven with different speeds of rotation.

In a preferred embodiment of the present invention, the second output shaft is hollow and the first output shaft extends through the second output shaft. Preferably, the first output shaft is then driven at higher speed than the crankshaft by a first smaller gear wheel on the first output shaft. Further, the first output shaft is drivingly connected to an integrated starter/generator at one end and an air conditioning compressor at the other end while the second output shaft is driven at a lower rpm than the crankshaft by a larger gear wheel on the second output shaft and is drivingly connected to one or two camshafts. By mounting the smaller gear wheel via an. engageable and disengageable one-way coupling on the first output shaft, the starter/generator is capable of, with the one-way coupling disengaged, driving the compressor when the engine is not running.

Other advantages, as well as objects and features of the present invention, will become apparent to the reader of this specification.

BRIEF DESCRIPTION OF DRAWINGS

The invention is described in more detail below with reference to the accompanying drawings, wherein:

FIG. 2 shows a schematic of the transmission in FIG. 1a;

DETAILED DESCRIPTION

Figure 1A:
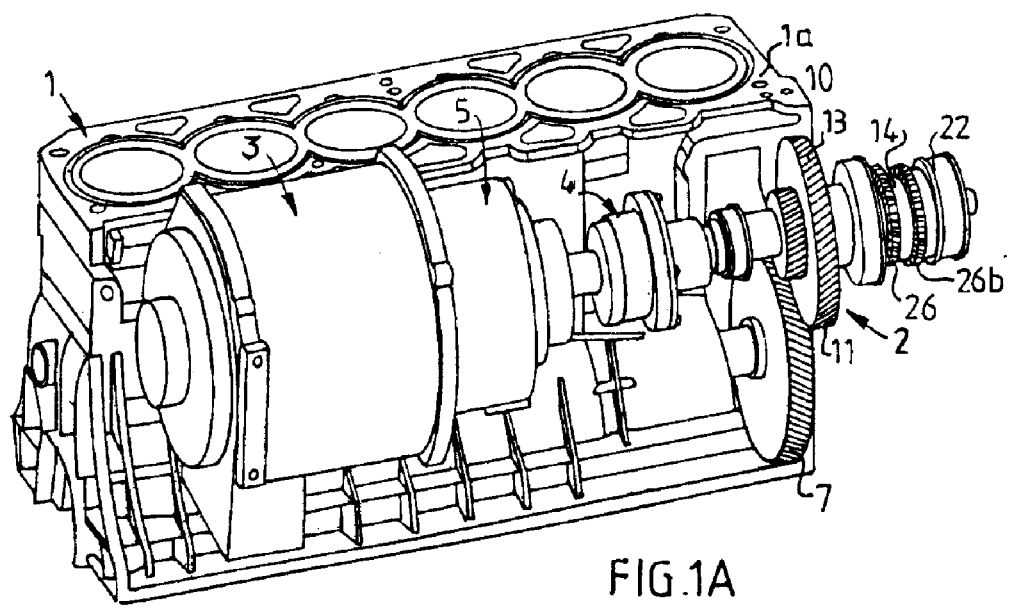
FIGS. 1a and 1b show a perspective view and a schematic cross-section, respectively, of an engine block with an auxiliary unit and transmission according to the invention.
Figure 1B:
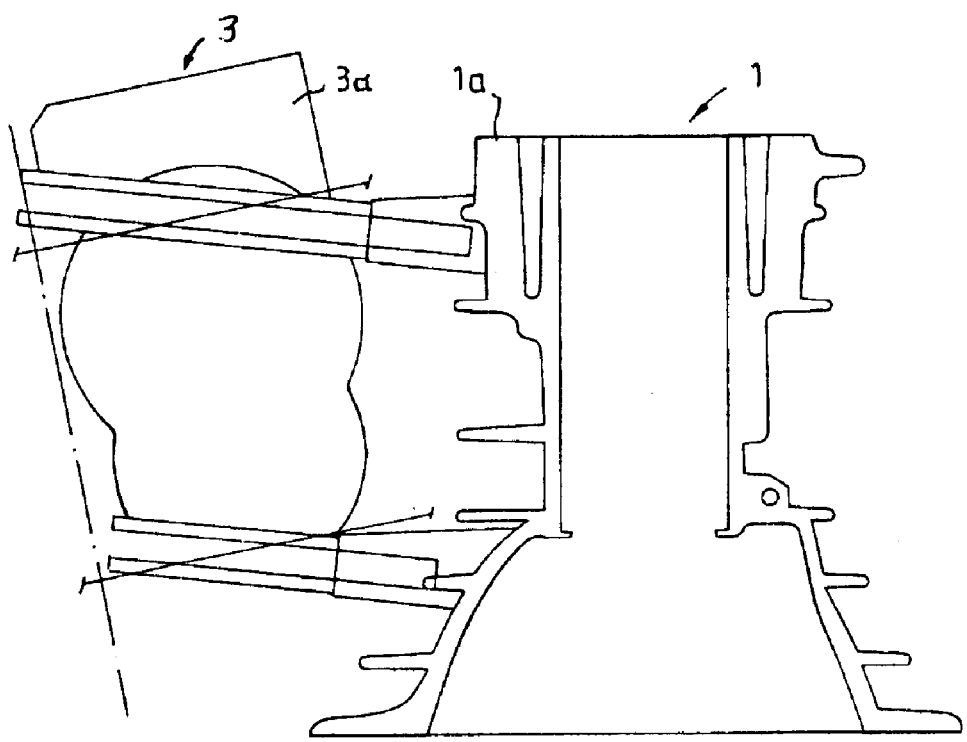

FIGS. 1a and 1b show an engine block 1 of a five cylinder in-line engine having a transmission 2 which is drivingly connected to an auxiliary unit in the form of an integrated starter/generator (ISG) 3 through a pulse damping coupling 4 and a gearbox 5, preferably a well known planetary type two-speed gearbox. As can be seen in FIGS. 1a and 1b, ISG 3 is mounted at a high level relative to engine block 1 so that the upper portion 3a of the ISG 3 is located at a level high above upper surface 1a of engine block 1. Transverse mounted engines are usually mounted leaning slightly rearward towards the passenger compartment. By mounting ISG 3 rather high, the position and weight of ISG 3 will assist, in the event of a collision sequence, to force the powertrain to rotate downwards during a backward movement, thereby causing the powertrain to move under the passenger compartment.

Figure 2:
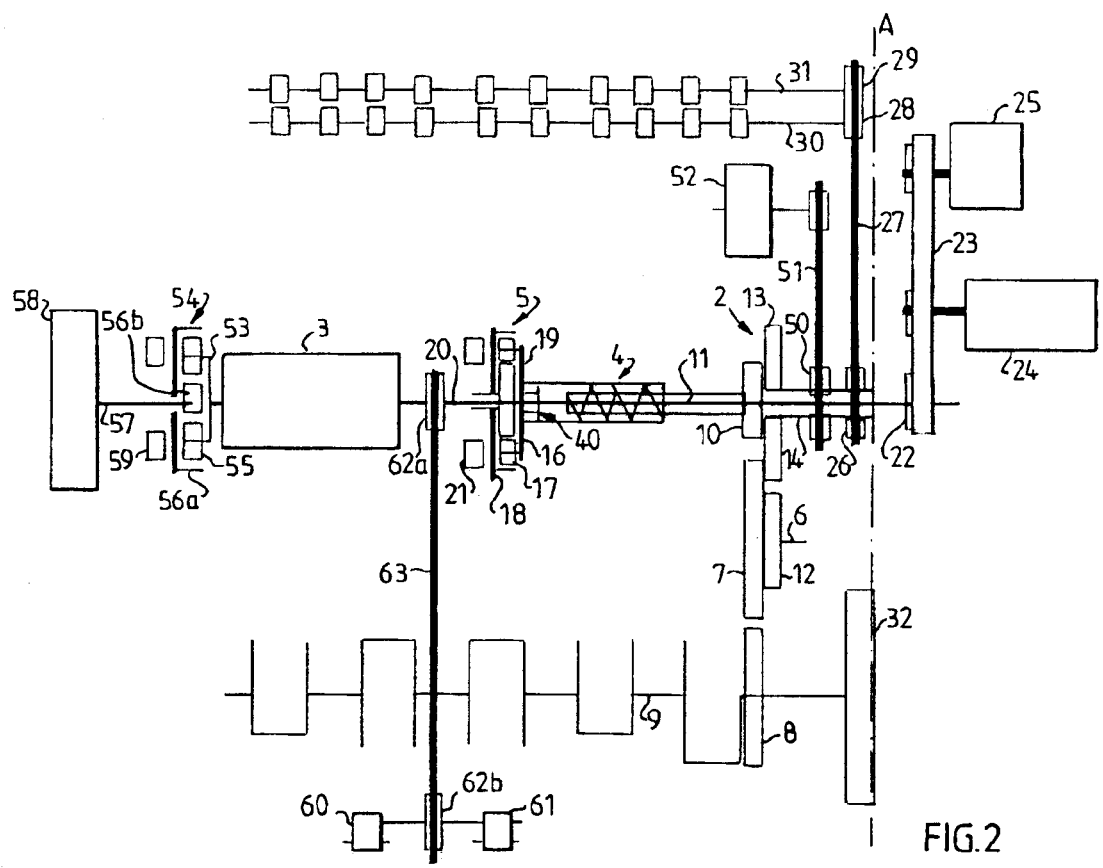

With reference to FIG. 2, transmission 2 comprises an input shaft 6 on which a first gear wheel 7 is nonrotatably mounted. Gear wheel 7 meshes with an output gear wheel 8, nonrotatably mounted on a crankshaft 9, rotatably journalled in engine block 1. Gear wheel 7 also meshes with a first output gear wheel 10 journalled on a first output shaft 11 of transmission 2, gear wheel 10 having a smaller radius than gear wheel 8. Gear wheel 7 transmits torque from crankshaft 9 to first output shaft 11 via pulse damping coupling 4 and a one-way clutch 40 (to be described in more detail with reference to FIG. 3) at higher rotational speed than the rotational speed of the crankshaft. A second gear wheel 12 having a smaller radius than gear wheel 7 is, nonrotatably mounted on input shaft 6 and meshes with a second output gear wheel 13 nonrotatably mounted on a second hollow output shaft 14 rotatably journalled on the outside of and concentrically with first output shaft 11. This second output gear has a larger radius than gearwheel 12. Due to the difference in gear ratio between the pairs of gears wheels 7, 10 and 12, 13, respectively, first output shaft 11 rotates with at a higher speed than second output shaft 14.

As shown in FIG. 2, gear wheel 10 is nonrotatably connected to an input side of pulse damping coupling 4, which is described in more detail with reference to FIG. 4. The output side of pulse damping coupling 4 is nonrotatably connected to a planet carrier 16 with planet gears 17 meshing with a ring gear 18 and a sun gear 19 nonrotatably attached to an end of an output/input shaft 20 of ISG 3. By a clutch 21, which can be electromagnetic, ring gear 18 can be locked to clutch housing 21 a or released, as will be described with reference to FIG. 3. A pulley 22 is nonrotatably attached to an opposite end portion of first output shaft 11. Via pulley 22 and a belt 23, first output shaft 11 drives an air conditioning compressor 24 and a water pump 25.

Output/input shaft 20 runs through ISG 3 and carries, on the side opposite planetary gearbox 5, non-rotatably, a planet carrier 53 of a second planetary gearbox 54, planet gears 55 of which mesh with a ring gear 56a and a sun gear 56b, which is non-rotatably attached to an input shaft 57 of a compressor (supercharger) 58. By this arrangement, ISG 3 can be used to drive compressor 58 at low engine speed to boost intake air pressure. ISG 3 is drivingly connected to and disconnected from compressor 58 by means of an electromagnetic clutch 59. The arrangement, shown in FIG. 2, also includes an engine oil pump 60 and an engine transmission oil pump 61, which are mounted on the outside of the engine block and are drivingly connected to output/input shaft 20 via pulleys 62a, 62b and a belt 63.

On second output shaft 14, two chain sprockets 26 and 26b are nonrotatably mounted. Via chain sprocket 26, a chain 27 and two additional chain sprockets 28 and; 29, the second output shaft 14 drives two camshafts 30, 31. Via a pulley 50, the second output shaft drives a fuel injection pump 52. As shown in FIG. 2, the chain trans 26–29 is located in plane A—A of engine block 1 as flywheel 32 mounted on crankshaft 9. Flywheel 32 is mounted at the end of engine block 1 against which the engine clutch and drivetrain transmission (not shown) are intended to be mounted. Thus, pulley 22, belt 23, compressor 24 and water pump 25 are situated outside the end plane A—A of engine block 1 but above the gearbox. Thus, these auxiliary units add no extra length to the total length of the engine including the engine clutch and drivetrain transmission.

Figure 3:
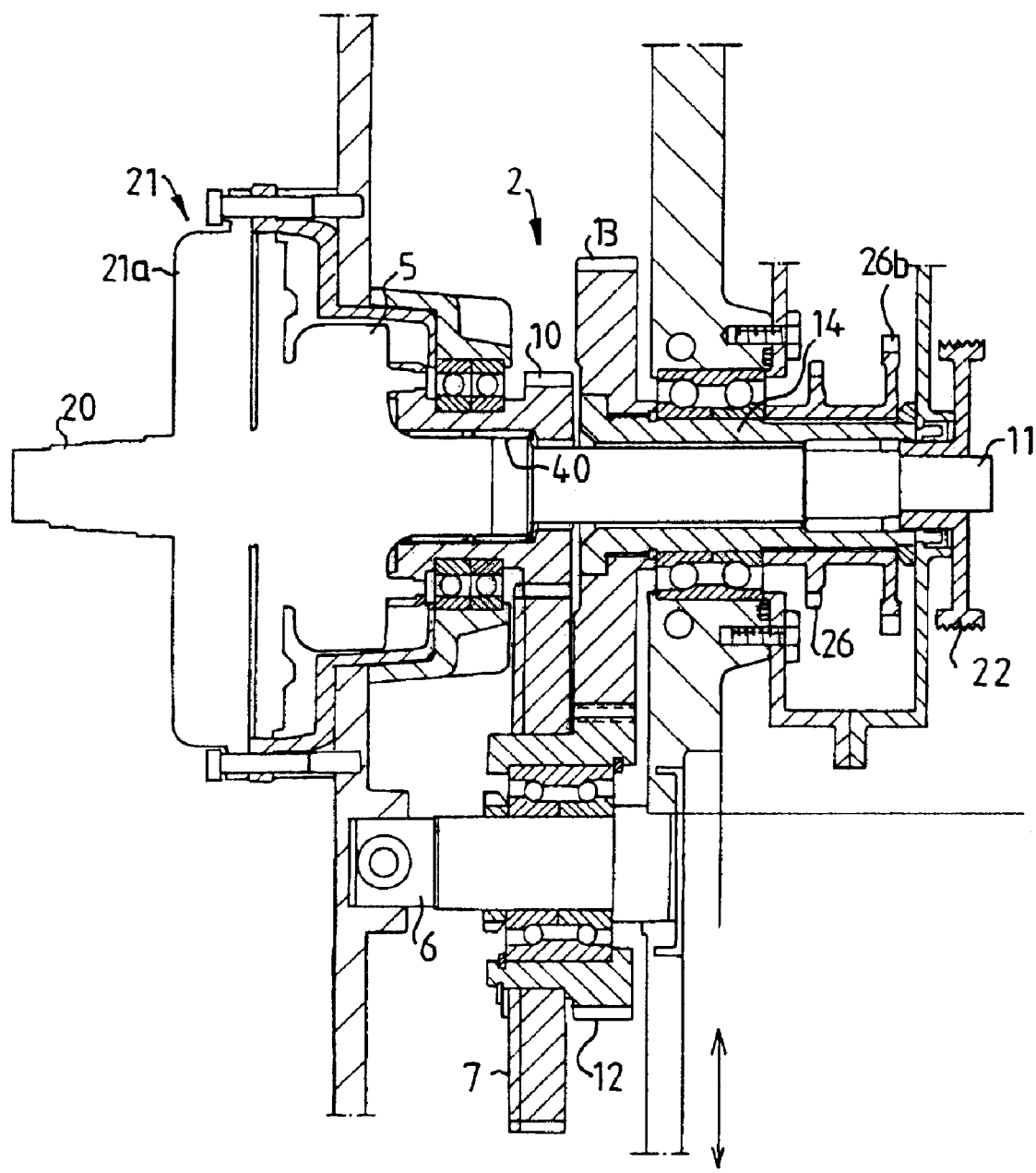
FIG. 3 shows a cross-section of a first embodiment of the transmission according to the present invention.

Transmission 2, described above and shown schematically in FIG. 2, is shown in more detail in FIG. 3 where elements common with elements in FIG. 2 have the same reference numerals as in FIG. 2. First output shaft 11 of transmission 2 and output shaft 20 from ISG 3 are joined so they rotate together with the same speed. Preferably, a pulse damping coupling (not shown) corresponding with pulse damping coupling 4, as shown in FIGS. 2 and 4, is arranged in the drive line between ISG 3 and clutch 21. Output shaft 11 is journalled in gear wheel 10, which is journalled in a gear casing 21b. Via the above-mentioned oneway clutch 40, gear wheel 10 can be connected to output shaft 11. When starting the engine by running ISG 3 as a motor, ring gear 18 is locked by clutch 21 to clutch housing 21a. Sun gear 19 then drives planet carrier 16 and with it gear wheel 10 at a lower speed than the input speed of shaft 11/20 to increase torque during starting. Thus, one-way clutch 40 is arranged such that it free wheels when gear wheel 10 runs with a lower speed than shaft 11. A typical ratio between input to output speed from the planetary gearing, i.e., the speed of shaft 11/20 versus the speed of planet carrier 16, is 3:1.

After the engine has started, the mode of the ISG can be switched to generator mode, at which time ring gear 18 is released by disengaging friction clutch 21. As soon as the speed of gear wheel 10 exceeds the speed of shaft 11, the one-way clutch. locks gear wheel 10 to shaft 11, thereby transmitting torque from the engine to ISG 3, now running as a generator.

The described planetary gearing and one-way clutch arrangement allows air conditioning compressor 24 to be driven by ISG 3 when the engine of the vehicle is turned off, since when gear wheel 10 is stationary and shaft 11 is driven by ISG 3, the one-way clutch is free-wheeling, thereby allowing shaft 11 to rotate in relation-to gear wheel 10 to drive compressor 24.

Alternatively, a friction clutch 21, a planetary gearing 5, and a one-way clutch 40 are used to achieve the above-described function, i.e., a speed reduction when running the ISG as a starter, a direct drive when driving the ISG as a generator from the engine of the vehicle and, finally, the possibility to disengage output gear wheel 10 from shaft 11 to drive an auxiliary unit, such as an air conditioning compressor, directly from the ISG when the engine is not running. Alternatively, the planetary type gearbox is replaced with a regular two-speed gearbox having a direct drive and a pair of low speed gear wheels, one of which is engageable and disengageable. In a further alternative, the one-way clutch is replaced with another type of engageable and disengageable clutch.

Figure 4:
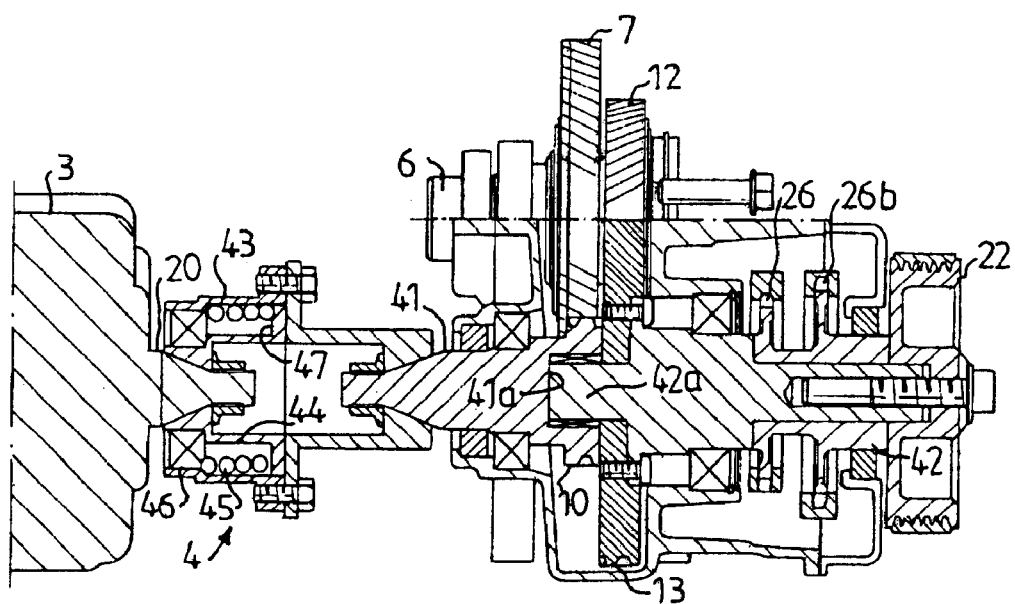
FIG. 4 shows a cross-section of a second embodiment of the transmission according to the present invention.

FIG. 4 shows an embodiment of the invention, which is slightly modified compared to that shown in FIG. 3. Like transmission 2 in FIG. 3, transmission 2 in FIG. 4 has two output shafts with a common axis of rotation, namely a first output shaft 41 and a second output shaft 42. As can be seen, shafts 41 and 42 are journalled end to end instead of one inside the other like the first and second output shafts of the transmission shown in FIG. 3. In particular, first shaft 41 is formed with a bore 41a receiving a stub portion 42a of second shaft 42. First output shaft 41 is connected to shaft 20 of ISG 3 by a pulse damping coupling 4, which comprises an outer cup like member 43 and an inner cup like member 44. In a space formed between members 43 and 44, a coil spring 45 is disposed, which has one end attached to outer member 43 and the other end attached to a flange 47 on inner member 44. Spring 45 is arranged such that, in a direction of rotation of the coupling 4, which results in a contraction of spring 45, some relative movement between members 43 and 44 is allowed. Rotation in the opposite direction will result in an expansion of spring 45 which will tend to prevent relative movement between members 43 and 44 when the coils of the spring are biased against the inner surface of outer cup like member 43.

A major difference between the arrangement shown in FIG. 3 and the one shown in FIG. 4 is that pulley 22 for air conditioning compressor belt 23 is nonrotatably mounted on second output shaft 14. This arrangement does not allow driving of the compressor from an ISG when the engine of the vehicle is not running. Therefore, it is suitable for an installation having a generator instead of an ISG.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

We claim:

1. An internal combustion engine, comprising:
   an engine block;
   a crankshaft rotatably journalled in said engine block; and
   a transmission mounted at one side of said engine block, said transmission having an input shaft with an input gear wheel meshing with an output gear wheel driven by said crankshaft and a first output shaft driven by the input shaft for driving at least one auxiliary unit, wherein said transmission has a second output shaft, said first and second output shaft being driven with different speeds of rotation from the input shaft. An internal combustion engine, comprising:
   an engine block;
   a crankshaft rotatably journalled in said engine block; and
   a transmission mounted at one side of said engine block, said transmission having an input shaft with an input gear wheel meshing with an output gear wheel driven by said crankshaft and a first output shaft driven by the input shaft for driving at least one auxiliary unit, wherein said transmission has a second output shaft, said first and second output shafts being driven with different speeds of rotation from the input shaft and said first and second input shafts have a common axis of rotation.

2. The internal combustion engine according to claim 1, wherein said second output shaft is hollow and said first output shaft extends through said second output shaft.

3. The internal combustion engine according to claim 2, wherein end portions of said first output shaft are drivingly connected to at least a first and a second auxiliary unit while the second output shaft is coupled to at least one camshaft.

4. The internal combustion engine according to claim 1 wherein said first and second output shafts have end portions facing one another, one of said end portions having an axial bore and the other one an axle stub which is journalled in the bore, the output shafts having end portions facing away from one another, each one adapted for driving an auxiliary unit.

5. The internal combustion engine according to claim 4 wherein at least one of said first and second output shafts is connected to at least one camshaft.

6. An internal combustion engine, comprising:
   an engine block;
   a crankshaft rotatably journalled in said engine block; and
   a transmission mounted at one side of said engine block, said transmission having an input shaft with an input gear wheel meshing with an output gear wheel driven by said crankshaft and a first output shaft driven by said input shaft for driving at least one auxiliary unit, wherein the transmission has a second output shaft, said first and second output shafts being driven with different speeds of rotation from the input shaft at least one of said output shafts being connected to an electrical machine wherein said electrical machine is an integrated starter/generator which is drivingly connected to one of said first and second output shafts via an engageable and disengageable coupling.

7. The internal combustion engine according to claim 6, wherein said coupling is a one-way coupling.

8. An internal combustion engine, comprising:
   an engine block;
   a crankshaft rotatably journalled in said engine block; and
   a transmission mounted at one side of said engine block, said transmission having an input shaft with an input gear wheel meshing with an output gear wheel driven by said crankshaft and a first output shaft driven by said input shaft for driving at least one auxiliary unit, wherein the transmission has a second output shaft, said first and second output shafts being driven with different speeds of rotation from the input shaft, at least one of said output shafts being connected to an electrical machine wherein said electrical machine is connected to one of said first and second output shafts via a two-speed gearbox.

9. An internal combustion engine, comprising:
   an engine block;
   a crankshaft rotatably journalled in said engine block; and
   a transmission mounted at one side of said engine block said transmission having an input shaft with an input gear wheel meshing with an output gear wheel driven by said crankshaft and a first output shaft driven by said input shaft for driving at least one auxiliary unit, wherein the transmission has a second output shaft, said first and second output shafts being driven with different speeds of rotation from the input shaft, at least one of said output shafts being connected to an electrical machine wherein the one of said first and second output shafts, which is connected to said electrical machine, is also drivingly connected to an air conditioning compressor.

10. An internal combustion engine, comprising:
    an engine block;
    a crankshaft rotatably journalled in said engine block; and
    a transmission mounted at one side of said engine block, said transmission having an input shaft with an input gear wheel meshing with an output gear wheel driven by said crankshaft and a first output shaft driven by said input shaft for driving at least one auxiliary unit, wherein the transmission has a second output shaft, said first and second output shafts being driven with different speeds of rotation from the input shaft, at least one of said output shafts being connected to an electrical machine wherein the one of said first and second output shafts, which is connected to said electrical machine, is also drivingly connected to a supercharger via an engageable and disengageable coupling.

11. An internal combustion engine, comprising:
    an engine block;
    a crankshaft rotatably journalled in said engine block: and
    a transmission mounted at one side of said engine block, said transmission having an input shaft with an input gear wheel meshing with an output gear wheel driven by said crankshaft and a first output shaft driven by said input shaft for driving at least one auxiliary unit, wherein the transmission has a second output shaft, said first and second output shafts being driven with different speeds of rotation from the input shaft, at least one of said output shafts being connected to an electrical machine wherein the one of said first and second output shafts, which is connected to said electrical machine, is also connected to an oil pump.

12. An internal combustion engine, comprising:
    an engine block;
    a crankshaft rotatably journalled in said engine block; and
    a transmission mounted at one side of said engine block, said transmission having an input shaft with an input gear wheel meshing with an output gear wheel driven by said crankshaft and a first and a second output shaft driven by the input shaft for driving a first and a second auxiliary unit, the transmission being arranged at one side of the engine block so that one of said auxiliary units is located beside the engine block while the other of said auxiliary units extends above and past an end plane of the engine adapted for mounting an engine gearbox.

13. The internal combustion engine according to claim 12, wherein said auxiliary unit located beside said engine block is an integrated starter/generator which is arranged relative to said engine block so that an upper portion thereof extends above an upper plane of said engine block.

14. An internal combustion engine, comprising:

an engine block:

a crankshaft rotatably journalled in said engine block; and a transmission mounted at one side of said engine block, said transmission having an input shaft with an input gear wheel meshing with an output gear driven by the crankshaft, a first output shaft driven by the input shaft for driving at least one auxiliary unit and a second output shaft, one of said first and second output shafts being driven at a lower speed than the crankshaft speed and the other one with a speed higher than the crankshaft speed wherein the output shaft driven at said lower speed is drivingly connected to a camshaft transmission and the output shaft driven at said higher speed is drivingly connected to an electric machine.

\* \* \* \* \*